United States Patent
Christidis et al.

(10) Patent No.: US 11,743,200 B2
(45) Date of Patent: Aug. 29, 2023

(54) TECHNIQUES FOR IMPROVING RESOURCE UTILIZATION IN A MICROSERVICES ARCHITECTURE VIA PRIORITY QUEUES

(71) Applicant: NETFLIX, INC., Los Gatos, CA (US)

(72) Inventors: Konstantinos Christidis, Campbell, CA (US); Aravindan Ramkumar, Los Gatos, CA (US); Poorna Chandra Tejashvi Reddy, Fremont, CA (US); Chunyun Zhao, Cupertino, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/409,139

(22) Filed: Aug. 23, 2021

(65) Prior Publication Data

US 2023/0053933 A1 Feb. 23, 2023

(51) Int. Cl.
*H04L 41/5054* (2022.01)
*H04L 47/52* (2022.01)
*H04L 47/2466* (2022.01)
*H04L 47/2475* (2022.01)

(52) U.S. Cl.
CPC ........ *H04L 47/522* (2013.01); *H04L 47/2466* (2013.01); *H04L 47/2475* (2013.01)

(58) Field of Classification Search
CPC .......... H04L 47/522; H04L 47/2466; H04L 47/2475
See application file for complete search history.

(56) References Cited

U.S. PATENT DOCUMENTS

| | | | |
|---|---|---|---|
| 6,563,836 B1* | 5/2003 | Capps | G06F 9/544 709/215 |
| 11,228,656 B1* | 1/2022 | Celestine | G06F 9/546 |
| 2014/0162705 A1* | 6/2014 | De Wit | H04W 68/02 455/458 |
| 2018/0254996 A1* | 9/2018 | Kairali | H04L 67/1036 |

(Continued)

OTHER PUBLICATIONS

Nanavati, et al., "FOQS: Scaling a distributed priority queue", https://engineering.fb.com/2021/02/22/production-engineering/foqs-scaling-a-distributed-priority-queue/, Feb. 22, 2021, 11 pages.

(Continued)

*Primary Examiner* — Abdelnabi O Musa
(74) *Attorney, Agent, or Firm* — Artegis Law Group, LLP

(57) ABSTRACT

In various embodiments, a flexible queue application allocates messages stored in priority queues to clients. In operation, the flexible queue application receives, from a client, a request to allocate a message from a priority queue. At least a first message and a second message are stored in the priority queue, and the priority of the first message is higher than the priority of the second message. The flexible queue application determines that the first message is pending but does not satisfy an allocation constraint. The flexible queue allocation then determines that the second message is pending and satisfies the allocation constraint. The flexible queue application allocates the second message to the client. Advantageously, because the flexible queue application can adapt the priority-based ordering of priority queues based on allocation constraints, the flexible queue application can efficiently enforce resource-related constraints when allocating messages from priority queues.

20 Claims, 5 Drawing Sheets

(56) References Cited

U.S. PATENT DOCUMENTS

| | | | | |
|---|---|---|---|---|
| 2018/0307524 A1* | 10/2018 | Vyas | ................... | G06F 9/45504 |
| 2019/0199648 A1* | 6/2019 | Chen | ................... | H04L 12/1881 |
| 2020/0092240 A1* | 3/2020 | Pokharel | ................ | H04L 51/18 |
| 2020/0264942 A1* | 8/2020 | Liu | ....................... | G06F 9/4881 |
| 2022/0317754 A1* | 10/2022 | Li | ......................... | G06F 1/3206 |

OTHER PUBLICATIONS

Wikipedia, "Earliest deadline first scheduling", Jul. 5, 2022, https://en.wikipedia.org/wiki/Earliest_deadline_first_scheduling, 5 pages.
International Search Report for application No. PCT/US2022/074266 dated Oct. 17, 2022.
Miguel, San Frank, "The Netflix Cosmos Platform, Orchestrated Functions as a Microservice", https://netflixtechblog.com/the-netflix-cosmosplatform-35c14d9351ad, Mar. 1, 2021, 14 pages.
Helland, Pat, "Life Beyond Distributed Transactions An apostate's opinion", https://queue.acm.org/detail.cfm?id=3025012, Dec. 12, 2016, 30 pages.
Ferreira, Ricardo, "How to Prioritize Messages in Apache Kafka", https://www.confluent.io/blog/prioritize-messages-in-kafka/, Sep. 10, 2020, 13 pages.
Wikipedia, "Lock (computer science)—Wikipedia", https://en.wikipedia.org/wlindex.php?title=Lock_computer_science)&oldid=715530007, Apr. 16, 2016, 8 pages.
Wikipedia, "Serializing tokens—Wikipedia", https://en.wikipedia.org/w/index.php?title=Serializing_tokens&oldid=800118344, Sep. 11, 2017, 3 pages.

* cited by examiner ically add messages specifying tasks to the priority queue and one or more consumers that can concurrently consume messages stored in the priority queue. A typical priority queue allocates the messages to consumers based on the priorities of tasks specified by the messages.

TECHNIQUES FOR IMPROVING RESOURCE UTILIZATION IN A MICROSERVICES ARCHITECTURE VIA PRIORITY QUEUES

BACKGROUND

Field of the Various Embodiments

Embodiments relate generally to computer science and media processing platforms and, more specifically, to techniques for improving resource utilization in a microservices architecture via priority queues.

Description of the Related Art

In a microservice architecture, a software application is made up of multiple single-purpose, independently-deployable smaller applications or "microservices." In many microservices-based applications, the microservices delegate tasks to other microservices for background or "asynchronous" execution via one or more priority queues. Each priority queue is associated with one or more producers that can concurrently add messages specifying tasks to the priority queue and one or more consumers that can concurrently consume messages stored in the priority queue. A typical priority queue allocates the messages to consumers based on the priorities of tasks specified by the messages.

One drawback associated with delegating tasks via priority queues is that adapting the priority-based allocation of the tasks to reflect task-specific resource considerations can be problematic. In particular, enforcing resource constraints to ensure the proper operation of a microservices-based application can significantly reduce the overall performance, scalability, or both of the microservices-based application. For instance, a common resource constraint is that tasks that modify a shared data set cannot be executed concurrently. If such a resource constraint is not satisfied, then the integrity of the shared data set can be compromised.

One approach to ensuring serial execution of a group of tasks delegated to a priority queue involves implementing an application-level exclusive lock via an external lock management application. At any given point in time, the exclusive lock can be held by at most one of the consumers of the priority queue. The consumer holding the exclusive lock is the only consumer of the priority queue that can consume a task included in the group of tasks. In some implementations, prior to consuming a task controlled via the exclusive lock, a consumer interacts with the lock management application in an attempt to acquire the exclusive lock. If the consumer is initially unable to acquire the exclusive lock, then the consumer continues to attempt to acquire the exclusive lock from the lock management application until the exclusive lock is available. Upon acquiring the exclusive lock, the consumer drains the task from the priority queue, executes the task, and then releases the exclusive lock.

The approach described above substantially reduces the overall performance of microservices-based applications for the following reasons. First, the inter-application communication delays between consumers and the lock management application and the time wasted waiting for the exclusive lock to become available can significantly reduce the throughput of the consumers. Second, a task that cannot be consumed until an exclusive lock becomes available prevents the priority queue from distributing lower priority messages to consumers. Therefore, tasks that would otherwise be executed concurrently with other tasks are unnecessarily blocked from being executed.

As the foregoing illustrates, what is needed in the art are more effective techniques for delegating tasks to consumers via priority queues.

SUMMARY

One embodiment sets forth a computer-implemented method for processing a request to allocate a message from a priority queue. The method includes receiving, from a first client, a first request to allocate a message from a priority queue; determining that a first message that is stored in the priority queue and is pending does not satisfy a first allocation constraint, where a first priority is associated with the first message; determining that a second message that is stored in the priority queue and is pending satisfies the first allocation constraint, where the first priority associated with the first message is higher than a second priority associated with the second message; and allocating the second message to the first client.

At least one technical advantage of the disclosed techniques relative to the prior art is that, with the disclosed techniques, tasks stored in exclusive priority queues can be automatically serialized without reducing the throughput of the consumers of the exclusive priority queues. In that regard, because concurrency constraints are enforced as messages stored in exclusive priority queues are allocated to consumers, the consumers can drain messages from priority queues without reservation. Furthermore, with the disclosed techniques, because lower-priority messages can be distributed to consumers while the distribution of higher-priority messages is deferred as per values for exclusivity keys, concurrency is not unnecessarily curtailed. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
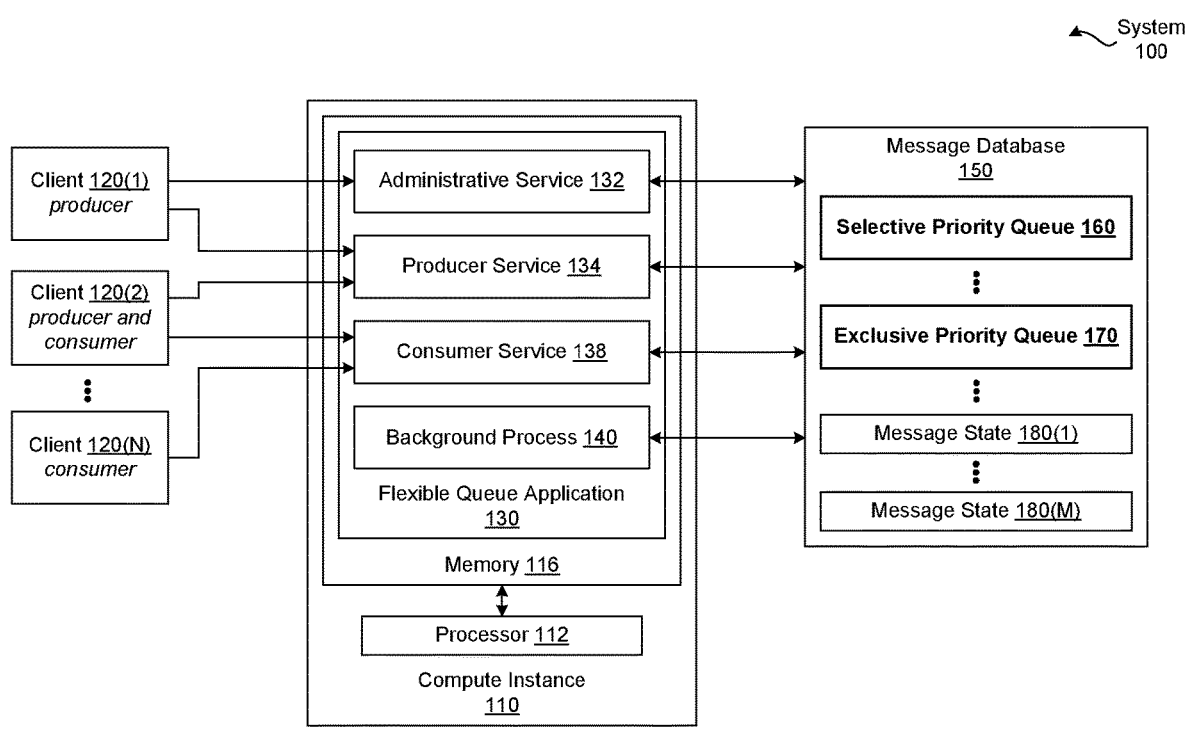
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

To accomplish an overall goal of a microservices-based application, constituent microservices can delegate messages specifying tasks to other constituent microservices for asynchronous execution via one or more concurrent priority queues. In a typical concurrent priority queue, multiple producers add messages having associated priorities to the concurrent priority queue, and the concurrent priority queue allocates messages stored in the queue to multiple consumers in order of priority. One drawback associated with delegating tasks via typical concurrent priority queues is that modifying the order in which messages are allocated to account for task-specific resource considerations can substantially reduce the overall performance of microservices-based applications.

For instance, in one approach to ensuring the integrity of a data set that can be modified by any task included in a group of tasks that are delegated to a concurrent priority queue, an exclusive lock is implemented via a lock management application. At any given time, the holder of the exclusive lock is the only consumer of the priority queue that can execute a task included in the group of tasks. In operation, inter-application communication delays and time wasted waiting for the exclusive lock to become available can significantly reduce the throughput of the consumers. Further, if the highest priority message in the priority queue specifies a task requiring the exclusive lock, lower-priority tasks that could otherwise be executed concurrently with other tasks can be unnecessarily blocked from being executed.

With the disclosed techniques, a flexible queue application enables producers to create and add messages to selective priority queues and exclusive priority queues. Each message in a selective priority queue includes, without limitation, a payload (e.g., a task), a priority, and a set of zero or more key-value pairs. Notably, any number of key-value pairs can reflect task-specific resource considerations, such as a value of graphics processing unit (GPU) for a key of processor. Any number (including all) of the messages in a selective priority queue can be allocated concurrently to different consumers. To process a message in a selective priority queue, a consumer issues an allocate request that specifies zero or more key-value pairs. If one or more messages in the selective priority queue are available for allocation and include each of the specified key-value pairs, then the flexible queue application allocates the highest priority of these "matching" messages to the consumer for processing.

When a producer creates an exclusive priority queue, the producer specifies an exclusive priority key. Each message stored in the exclusive priority queue includes, without limitation, a payload, a priority, a key-value pair having the exclusive priority key as the key, and zero or more other key-value pairs. The flexible queue application prohibits concurrent processing or "running" of messages stored in the exclusive priority queue having the same value for the associated exclusivity key. To process a message in an exclusive priority queue, a consumer issues an allocation request that specifies zero or more key-value pairs. If one or more of the messages included in the exclusive priority queue are pending, are associated with unique values for the exclusivity key relative to the values for the exclusivity key associated with any running messages, and include each of the specified key-value pairs, then the flexible queue application allocates the highest priority of these "unique and matching" messages to the consumer for processing.

At least one technical advantage of the disclosed techniques relative to the prior art is that an exclusive priority queue can be used to automatically serialize tasks without reducing the throughput of the consumers of the exclusive priority queue. More specifically, because the flexible queue application enforces concurrency constraints via the exclusivity key when allocating messages, each consumer can issue allocation requests for an exclusive priority queue without regard to other consumers. Furthermore, because the flexible queue application can bypass higher priority pending messages when allocating messages stored in selective priority queues and exclusive priority queues, the flexible queue application can enforce a wide variety of task-specific constraints without unnecessarily curtailing concurrency. These technical advantages represent one or more technological advancements over prior art approaches.

System Overview

FIG. 1 is a conceptual illustration of a system 100 configured to implement one or more aspects of the various embodiments. As shown, the system 100 includes, without limitation, a compute instance 110, clients 120(1)-120(N), and a message database 150, where N can be any positive integer. For explanatory purposes, the clients 120(1)-120(N) are also referred to herein individually as "the client 120" and collectively as "the clients 120."

In some embodiments, the system 100 can include, without limitation, any number of other compute instances in addition to the compute instance 110. In the same or other embodiments, any number of the components of the system 100 can be distributed across multiple geographic locations or implemented in one or more cloud computing environments (i.e., encapsulated shared resources, software, data, etc.) in any combination.

As shown, the compute instance 110 includes, without limitation, a processor 112 and a memory 116. The processor 112 can be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 of the compute instance 110 stores content, such as software applications and data, for use by the processor 112 of the compute instance 110. In some embodiments, each of the compute instance 110 and zero or more other compute instances can include any number of processors 112 and any number of memories 116 in any combination. In particular, the compute instance 110 and zero or more other compute instances can provide any number of multiprocessing environments in any technically feasible fashion.

The memory 116 can be one or more of a readily available memory, such as random access memory (RAM), read only memory (ROM), floppy disk, hard disk, or any other form of digital storage, local or remote. In some embodiments, a storage (not shown) may supplement or replace the memory 116. The storage can include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more software applications. For explanatory purposes only, each software application is depicted as residing in the memory 116 of the compute instance 110 and executing on the processor 112 of the compute instance 110. However, as persons skilled in the art will recognize, the functionality of each software application can be distributed across any number of other software applications that reside in any number of memories of any number of compute instances (e.g., the compute instance 110 and/or any number of other compute instances) and execute on the processors of any number of compute instances in any combination.

In particular, the compute instance 110 is configured to enable the clients 120 to communicate messages asynchronously via priority queues, where each priority queue can be associated with one or more producers and one or more consumers. Each message includes, without limitation, any type of payload and any type of priority. In some embodiments, each payload is a binary large object (blob) that can store any amount and/or types of data (e.g., text, binary data, etc.). In the same or other embodiments, any number of the payloads specify tasks. In some embodiments, each priority is a deadline that is specified as a point-in-time in any technically feasible fashion (e.g., a time stamp), where the earlier the deadline, the higher the priority. In some other embodiments, each priority is an instance number, where the higher the instance number, the higher the priority. In yet other embodiments, each priority is a word having an associated priority (e.g., "first_class" is associated with a highest priority, "standard", is associated with a medium priority, and "bulk" is associated with a lowest priority, etc.).

As referred to herein, a conventional priority queue can be any type of abstract data structure that enables elements (e.g., messages) having associated priorities to be added to the priority queue, elements in the priority queue to be accessed in order of priority, and elements to be deleted from the priority queue in order of priority. As used herein, "in order of priority" refers to an order from highest priority to lowest priority. In a typical implementation of a conventional priority queue, an associated non-abstract data structure, ordering of the elements within the non-abstract data structure, or both are optimized for accessing the elements in order of priority.

Some software applications enable concurrent, asynchronous message-based communications between multiple clients via any number of conventional concurrent priority queues. As referred to herein, a conventional concurrent priority queue directly or indirectly (e.g., via a software application or service) enables multiple clients to add messages having associated priorities to the priority queue and multiple clients to directly or indirectly request access to or "allocation" of messages from the priority queue in priority order. Clients that add messages having associated priorities to a priority queue are also referred to herein as "producers" of the priority queue. Clients that access messages from a priority queue are also referred to herein as "consumers" of the priority queue. A client can be a producer with respect to zero or more priority queues and a consumer with respect to zero or more other priority queues.

In particular, and as described previously herein, some microservices-based applications enable multiple microservices to delegate tasks to other microservices via conventional concurrent priority queues. One drawback of allocating tasks via conventional concurrent priority queues is that adapting the priority-based allocation of the tasks to reflect task-specific resource considerations can substantially reduce the overall performance of microservices-based applications. In particular, some conventional techniques for prohibiting concurrent execution of tasks included in a priority queue can reduce the throughput of microservices, unnecessarily reduce concurrency, or both.

Adapting the Priority-Based Allocation of Tasks Stored in Priority Queues

To address the above problems, the compute instance 110 includes, without limitation, a flexible queue application 130 that enables asynchronous message-based communication via one or more selective priority queues and/or one or more exclusive priority queues.

Each selective priority queue enables producers to optionally include query metadata in messages and enables consumers to optionally specify query metadata as filters in requests to allocate messages from the selective priority queue. In some embodiments, the query metadata optionally specified in each message added to a selective priority queue includes, without limitation, any number of key-value pairs. In the same or other embodiments, each message included in the selective priority queue includes, without limitation, a key-value list that specifies zero or more key-value pairs. If the key-value list in a message does not specify any key-value pairs, then no query metadata is associated with the message. In some embodiments, each request to allocate a message from the selective priority queue specifies, without limitation, zero or more key-value pairs that are used as filters. More specifically, in some embodiments, the flexible queue application 130 ensures that the key-value list in the allocated message specifies at least each of the key-value pairs specified in the associated request. All messages stored in a selective priority queue can be allocated and processed concurrently.

The keys and associated valid values can be determined in any technically feasible fashion. In some embodiments, the keys and the associated valid values are defined by the clients 120. In the same or other embodiments, one or more keys are attributes of tasks and one or more keys are attributes of resources. For instance, in some embodiments, the keys include, without limitation, a processor type denoted as "ProcessorType," a function identifier (ID) denoted as "FunctionID," and a project ID denoted as "ProjectID." In the same or other embodiments, valid values for the processor type include, without limitation, GPU, CPU, tensor processing unit (TPU), neural network processing unit (NPU), and accelerated processing unit (APU). In some embodiments, valid values for the function ID are unique IDs (UIDs) for functions associated with the clients 120. In the same or other embodiments, valid values for the project ID are UIDs for projects associated with the clients 120.

If a consumer specifies a metadata-based filter in a request to allocate a message from a selective priority queue, then the flexible queue application 130 allocates the highest priority pending message in the selective priority queue that satisfies the specified metadata-based filter. The flexible queue application 130 therefore disregards any other pending messages in the selective priority queue that have higher priorities but do not satisfy the specified metadata-based filter. Accordingly, each metadata-based filter is a different filter-based allocation constraint associated with a different request. If, however, a consumer does not specify a metadata-based filter in a request to allocate a message from a selective priority queue, then the flexible queue application 130 allocates the highest priority pending message in the selective priority queue and disregards any query metadata included in the messages.

Each exclusive priority queue requires each message to specify a value for a client-specified exclusivity key and ensures serial processing of messages having the same value for the exclusivity key. Any number of messages stored in an exclusive priority queue having different values for the associated exclusivity key can be allocated and processed concurrently. In some embodiments, the exclusivity key for each exclusive priority queue can be the same as the exclusivity keys for any number (including zero) of other exclusive priority queues and can be different from the exclusivity keys for any number (including zero) of other exclusive priority queues.

In some embodiments, the client 120 that creates an exclusive priority queue specifies the exclusivity key for the exclusive priority queue. In the same or other embodiments, the flexible queue application 130 requires that an exclusivity key is specified in each request to create an exclusive priority queue. In some embodiments, valid values for each exclusivity key can be determined and/or specified in any technically feasible fashion (e.g., by the clients 120). In some embodiments, an exclusivity key and the associated value are a key-value pair that is also referred to herein as "an exclusivity key-value pair." The key of each exclusivity key-value pair is the exclusivity key of the associated exclusive priority queue and the value of each exclusivity key-value pair is a value of the exclusivity key. For explanatory purposes, a value for an exclusivity key is also referred to herein as "an exclusivity key value." In some embodiments, each exclusivity key can be a key that is associated with zero or more selective priority queues.

In some embodiments, the exclusivity key-value pair in each message in an exclusive priority queue also serves as at least a portion of query metadata associated with the message. In the same or other embodiments, each exclusive priority queue requires producers to specify a value for the exclusivity key in each message and enables producers to optionally include any amount and/or types of other query metadata in each message. In some embodiments, the other query metadata optionally specified in each message added to an exclusive priority queue includes, without limitation, any number of key-value pairs. In the same or other embodiments, to add a message to an exclusive priority queue, the flexible queue application 130 requires that a value for the exclusivity key of the exclusive priority queue is specified in the message and optionally allows zero or more other key-value pairs to be specified in the message.

In some embodiments, each message included in an exclusive priority queue can specify a value for the exclusivity key of the exclusive priority queue and any amount and/or type of other query metadata in any technically feasible fashion. For instance, in some embodiments, each message included in an exclusive priority queue includes, without limitation, a key-value list that specifies the exclusivity key-value pair and zero or more other key-value pairs. In the same or other embodiments, for each exclusive priority queue, the flexible queue application 130 ensures serial processing of messages having the same value for the exclusivity key and ensures that the key-value list in an allocated message specifies at least each of the key-value pairs specified in the associated request.

Each request from a consumer to allocate a message from an exclusive priority queue can optionally specify a metadata-based filter. The metadata-based filter can include, without limitation, a value for the exclusivity key and/or any amount and/or types of other metadata. If a consumer does not specify a metadata-based filter in a request to allocate a message from an exclusive priority queue, then the flexible queue application 130 allocates the highest priority pending message in the exclusive priority queue that complies with an exclusivity allocation constraint. The flexible queue application 130 therefore disregards any other pending messages in the exclusive priority queue that have higher priorities but do not comply with the exclusivity allocation constraint. For each exclusive priority queue, the corresponding exclusivity allocation constraint is that, at any given time, each running message in the exclusive priority queue has a different value for the exclusivity key that is associated with the exclusive priority queue.

By contrast, if a consumer specifies a metadata-based filter in a request to allocate a message from an exclusive priority queue, then the flexible queue application 130 allocates the highest priority pending message in the exclusive priority queue that complies with the exclusivity allocation constraint and satisfies the filter-based allocation constraint specified via the metadata-based filter. The flexible queue application 130 therefore disregards any other pending messages in the exclusive priority queue that have higher priorities but do not comply with the exclusivity allocation constraint and/or do not satisfy the specified metadata-based filter.

As noted previously herein, in some embodiments, a request to allocate a message from an exclusive priority queue can specify, without limitation, an exclusivity key-value pair and/or zero or more other key-value pairs. For example, a request to allocate a message from an exclusive priority queue having an exclusivity key of "projectID" could specify the the exclusivity key-value pair "projectID=P1" and "processorType=GPU." If the flexible queue application 130 determines that a running message in the priority queue has the exclusivity key value P1, then the flexible queue application 130 does not allocate a message in response to the request. Otherwise, the flexible queue application 130 attempts to identify "matching" pending messages that specify both of the key-value pairs "projectID=P1" and "processorType=GPU." If the flexible queue application 130 is able to identify at least one matching pending message, then the flexible queue application 130 allocates the highest priority matching pending message in response to the request. Otherwise, the flexible queue application 130 does not allocate a message in response to the request.

In some embodiments, each simple priority queue and each exclusive priority queue can include, without limitation and at any given time, zero or more pending messages, zero or more running messages, zero or more invisible messages, and zero or more terminal messages. Each pending message is available for allocation. Each running message is allocated to an associated consumer. Each invisible message is temporarily unavailable for allocation. Each terminal message is permanently unavailable for allocation. Pending messages, running messages, invisible messages, and terminal messages are described in greater detail below.

As shown, a selective priority queue 160 is one example of any number of selective priority queues that can be created and interfaced with via the flexible queue application 130 in some embodiments. The selective priority queue 160 is described in greater detail below in conjunction with FIG. 2A. As also shown, an exclusive priority queue 170 is one example of any number of exclusive priority queues that can be created and interfaced with via the flexible queue application 130 in some embodiments. The exclusive priority queue 170 is described in greater detail below in conjunction with FIG. 2B. For explanatory purposes, the selective priority queues (including the selective priority queue 160) and the exclusive priority queues (including the exclusive priority queue 170) are also referred to herein individually as "a flexible priority queue" and collectively as "flexible priority queues."

In some embodiments, the flexible queue application 130 can enforce any type of filter-based allocation constraint that can be optionally specified in a request to allocate a message from a flexible priority queue. In the same or other embodiments, the flexible queue application 130 can enforce any type of exclusivity allocation constraint based on any amount and/or type of metadata that is associated with messages in any technically feasible fashion.

In some embodiments, in addition to implementing flexible priority-based allocation policies that take into account any allocation constraints, the flexible queue application 130 can implement any number and/or types of other queue policies. Each queue policy is associated with an applicability scope that specifies whether the flexible queue application 130 is to apply the queue policy selectively or indiscriminately to selective priority queues and/or exclusive priority queues. In some embodiments, the flexible queue application 130 implements, without limitation, a priority policy, a lease policy, a retry policy, and an invisibility policy.

In some embodiments, the priority policy is that the priority included in each message is a deadline that specifies a point-in-time, and the priority order associated with allocating messages stored in each flexible priority queue is earliest-deadline-first order. In some embodiments, the flexible queue application 130 can implement any number and/or types of techniques to enable efficient evaluation of messages based on the associated allocation policy for each priority queue in priority order.

In some embodiments, as per the lease policy, the flexible queue application 130 allocates or leases a message in a flexible priority queue to a consumer of the flexible priority queue for a period of time referred to herein as a lease duration. While the message is leased to a consumer, the message is also referred to as a running message and is unavailable for leasing to other consumers of the flexibly priority queue. In some embodiments, each flexible priority queue specifies a default lease duration, a consumer can specify a lease duration that overrides the default lease duration via a request to allocate a message from a flexible priority queue, and a consumer can request a lease extension. If a consumer has not successfully processed a running message before the lease expires, then the flexible queue application 130 considers the attempt to process the message to be unsuccessful and deallocates the message from the consumer.

In some embodiments, as per the retry policy, the flexible queue application 130 allows a maximum number of attempts to successfully process each message. In some embodiments, each flexible priority queue can be associated with a different maximum number of attempts. If a message has not been successfully processed after the maximum number of attempts, then the flexible queue application 130 deletes the message from the flexible priority queue.

In some embodiments, as per the invisibility policy, before the initial attempt and each re-attempt to process a message, the message is invisible for a period of time referred to herein as an invisibility duration. When a message is invisible, the message is also referred to as an invisible message and is temporarily unavailable for leasing.

In some embodiments, each flexible priority queue can optionally specify a default invisibility duration and a producer can specify a message-specific invisibility duration that overrides any default invisible duration via a request to add a message to a flexible priority queue. In the same or other embodiments, a consumer can temporarily override any default invisibility duration and any message-specific invisibility duration for a single period of invisibility for a message. For instance, in some embodiments, a consumer can temporarily override any default invisibility duration when the consumer stops processing a message (e.g., electively via a "fail attempt" client request or a "postpone" client request, or involuntarily when failing to successfully process a message before the associated lease expires).

In some embodiments, the flexible queue application 130 can implement any number and/or types of variations to the leasing policy, the retry policy, and the invisibility described above. In the same or other embodiments, the flexible queue application 130 can implement any number and/or types of other queue policies instead of or in addition to the leasing policy, the retry policy, and the invisibility policy, or any combination therefore. The flexible queue application 130 can apply each queue policy to selective priority queues, exclusive priority queues, or all flexible priority queues. For instance, in some embodiments, the flexible queue application 130 implements any number and/or types of blacklisting policies, any number and/or types of whitelisting policies, any number and/or types of quarantine policies, or any combination thereof to each flexible priority queue.

As described in greater detail below in conjunction with FIG. 4, in some embodiments, the flexible queue application 130 establishes a message lifecycle via a set of states and associated state transformations for the messages that complement the queue policies. In some embodiments, the set of states includes, without limitation, an initial state that a message is in before the flexible queue application 130 stores the message in a flexible priority queue, any number and/or types of non-terminal in-queue states, any number and/or types of terminal in-queue states, and a final state that a message is in after the flexible queue application 130 deletes the message from the flexible priority queue, Each message can pass through each of the non-terminal in-queue states zero or more times while stored in a flexible priority queue, Each message passes through one of the terminal in-queue states while stored in a flexible priority queue and the only allowed state transition from each terminal in-queue state is a transition to the final state. A message that is in one of the terminal in-queue states is also referred to as a terminal message. In some embodiments, the set of states, the associated state transformations, and any number and/or types of state parameters enable the flexible queue application 130 to efficiently enforce the policies for the flexible queues and expose any amount (including none) and/or types of optional functionality to the clients 120.

As described in greater detail below in conjunction with FIG. 4, in some embodiments, the non-terminal in-queue states include, without limitation, invisible, pending, and running. If the state of a message is invisible, then the message is temporarily unavailable for allocation and is also referred to herein as an invisible message. In some embodiments, when the flexible queue application 130 updates the state of a message to invisible, the flexible queue application 130 determines an applicable invisibility duration. The invisibility duration is a state transition parameter that specifies the duration of time that the message can remain invisible before the flexible queue application 130 automatically updates the state of the message to pending.

If the state of a message is pending, then the message is available for allocation and is also referred to herein as a pending message. If the state of a message is running, then the message is allocated to a consumer that is processing the message. In some embodiments, when the flexible queue application 130 updates the state of a message to running, the flexible queue application 130 determines an applicable lease duration. The applicable lease duration is a state transition parameter that specifies the duration of time that the message can remain running before the flexible queue application 130 automatically deallocates the message from the associated consumer.

In some embodiments, the non-terminal in-queue states can include any number and/or types of other states in addition to or instead of invisible, pending, running. For instance, in some embodiments, the non-terminal in-queue states include, without limitation, invisible, pending, running, and quarantined.

In some embodiments, the terminal in-queue states include, without limitation, complete, error, and cancel. If the state of a message is complete, then a consumer has successfully processed the message before the expiration of the associated lease. If the state of a message is error, then the message has not been successfully processed before the associated lease expired during any of the maximum number of attempts. If the state of a message is cancel, then a consumer has indicated that the processing of the message is no longer needed. In some embodiments, the terminal in-queue states can include any number and/or types of other states in addition to or instead of complete, error, cancel, or any combination thereof.

For explanatory purposes, the functionality of the flexible queue application 130, selective priority queues, exclusive priority queues, the clients 120, and the message database 150 are described herein in the context of the selective priority queue 160, the exclusive priority queue 170, exemplary queue policies, and an exemplary message lifecycle. Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

In particular, the flexible queue application 130 can enable any number and/or types of clients 120 to create and interact with any number of selective priority queues, any number of exclusive priority queues, and any number and/or types of other queues in any technically feasible fashion. In some embodiments, the flexible queue application 130 enables any number and/or types of clients to create and interact with any number of selective priority queues but does not enable the clients 120 to create and interact with exclusive priority queues. In some other embodiments, the flexible queue application 130 enables any number and/or types of clients 120 to create and interact with any number of exclusive priority queues but does not enable the clients 120 to create and interact with selective priority queues.

As shown, in some embodiments, the flexible queue application 130 resides in the memory 116 of the compute instance 110 and executes on the processor 112 of the compute instance 110. In some embodiments, any amount (including all) of the functionality of the flexible queue application 130 can be distributed across any number of software applications that reside in any number of memory of any number of compute instances and execute on any number of processors of any number of compute instances in any combination. In the same or other embodiments, any number of instances of the flexible queue application 130 can reside in any number of memories of any number of compute instances and execute on any number of processors of the compute instances in any combination.

As shown, in some embodiments, the flexible queue application 130 includes, without limitation, an administrative service 132, a producer service 134, a consumer service 138, and a background process 140. In some embodiments, each of the administrative service 132, the producer service 134, and the consumer service 138 can interact with clients 120 and the message database 150. In the same or other embodiments, the background process 140 interacts with the message database 150 but does not interact with clients 120. In some embodiments, the flexible queue application 130 can interact with the clients 120 and/or the message database 150 in any technically feasible fashion instead of or in addition to via the administrative service 132, the producer service 134, the consumer service 138, and the background process 140.

In some embodiments, the administrative service 132, the producer service 134, the consumer service 138, or any combination thereof can be replaced or supplemented with any number and/or types of other services. In the same or other embodiments, the functionality of the administrative service 132, the producer service 134, the consumer service 138, or any combination thereof as described herein can be consolidated into any number (including one) service or can be distributed across any number and/or types of services. For explanatory purposes only, the administrative service 132, the producer service 134, the consumer service 138, and any other services implemented by the flexible queue application 130 are referred to herein as "flexible queue services."

Each of the clients 120 can be any type of component that is capable of communicating with the flexible queue application 130 in any technically feasible fashion. For instance, in some embodiments, each client 120 is a microservice, an orchestrator, a function, or a software application included in a microservices-based software application or a software platform. The clients 120 can execute across any number and/or types of processors in any technically feasible fashion. For instance, in some embodiments, each client 120 can execute on a GPU, a CPU, or a TPU. In the same or other embodiments, one or more of the clients 120 can execute within containers in a cloud computing environment.

The flexible queue application 130, the flexible queue services, and the clients 120 can communicate using any number and/or types of techniques, and the communication techniques can vary based on the type of data that is being communicated (e.g., messages, administrative commands, etc.). In some embodiments, each of the flexible queue services implements any type of application programming interface ("API") and the clients 120 execute any number and/or types of API calls as per the APIs. For instance, in some embodiments, each of the flexible queue services implements a remote procedure call (RPC) API and the clients 120 execute RPCs. As used herein, an "API call" can refer to an RPC or any other type of call that can be defined via any type of API.

In some embodiments, the administrative service 132 implements an administrative API that enables clients 120 to, without limitation, create flexible priority queues, retrieve settings of flexible priority queues, modify settings of flexible priority queues, and delete flexible priority queues. Each setting included in a flexible priority queue can specify any amount and/or types of information that is relevant to communicating via messages stored in the flexible priority queue.

In some embodiments, each selective priority queue can include, without limitation, any number and/or types of mandatory settings and any number and/or types of optional settings. As described in greater detail below in conjunction with FIG. 2A, in some embodiments, a queue ID, a default lease duration, and a maximum attempts are mandatory settings that are included in each selective priority queue. In the same or other embodiments, a default invisibility value is an optional setting that can be included in each selective priority queue.

As described in greater detail below in conjunction with FIG. 2B, in some embodiments, an exclusivity key, a queue ID, a default lease duration, and a maximum attempts are mandatory settings that are included in each exclusive priority queue. In the same or other embodiments, a default invisibility value is an optional setting that can be included in each exclusive priority queue.

In some embodiments, as part of processing API calls to create flexible priority queues, the administrative service 132 can require clients 120 to explicitly specify any number of mandatory settings and can specify defaults for the remaining mandatory settings. In particular, in some embodiments, the administrative service 132 enforces that an API call to create an exclusive priority queue explicitly specifies an exclusivity key.

In some embodiments, as part of processing API calls to modify the settings of a flexible priority queue, the administrative service 132 can implement any number and/or types of restrictions and/or constraints on the flexible priority queue. For instance, in some embodiments, a blacklist setting is included in the mandatory settings of each flexible priority queue. In the same or other embodiments, as part of processing an API call to modify the blacklist setting for a flexible priority queue, the administrative service 132 can disable or enable access to the flexible priority queue, the messages, and the states.

In some embodiments, the producer service 134 implements a producer API that enables clients 120 to, without limitation, add messages that optionally specify any amount and/or types of query metadata to existing selective priority queues, implicitly create and add messages that optionally specify any amount and/or types of query metadata to non-existent selective priority queues, and add messages that specify values for the proper exclusivity keys to existing exclusive priority queues. In some embodiments, as part of responding to a request to add a message to a non-existent selective priority queue, the producer service 134 creates a new selective priority queue that specifies a default value for each mandatory setting. In the same or other embodiments, as part of responding to producer API calls, the producer service 134 updates the states of messages from initial to invisible or pending as per the applicable invisibility duration.

In some embodiments, the consumer service 138 implements a consumer API that enables clients 120 to lease messages from flexible priority queues, extend leases of running messages, indicate successful processing attempts for running messages, indicate failed processing attempts for running messages, postpone running messages, and cancel invisible, running, or pending messages. Notably, a consumer can postpone a message currently allocated to the consumer for a variety of issues including, without limitation, to optimize the usage of resources. For example, a consumer can postpone a message having a payload that specifies a task when one or more external dependencies of the tasks are not yet met. In some embodiments, as part of responding to consumer API calls, the consumer service 138 can move messages between the states of invisible, pending, running, complete, error, and cancel.

Notably, each of the clients 120 can be a producer with respect to one or more priority queues (e.g., the selective priority queue 160) and a consumer with respect to one or more other priority queues (e.g., the exclusive priority queue 170). As denoted in italics, in some embodiments, the client 120(1) is a producer, the client 120(2) is both a producer and a consumer, and the client 120(N) is a consumer. In the same or other embodiments, any number of the clients 120 implement bi-directional communication via multiple flexible priority queues.

For instance, in some embodiments, the client 120(2) adds a message having a payload that specifies a task to the exclusive priority queue 170 via a producer API call, Another one of the clients 120 leases a message from the exclusive priority queue 170 via a consumer API call, executes the task, and adds a message having a payload that specifies the task results and query metadata of "clientID=2" to the selective priority queue 160 via a producer API call. Subsequently, the client 120(2) leases the task results message from the selective priority queue 160 via a consumer API call that specifies a filter of "clientID=2."

In response to API calls, each of the flexible queue services can execute any number and/or types of operations on queues, messages, and/or states, execute any number and/or types algorithms based on queues, messages, and/or states, or any combination thereof. In the same or other embodiments, each of the flexible queue services can enforce and number and/or types of restrictions when processing API calls. In some embodiments, each of the flexible queue services can interact with zero or more other flexible queue services and/or other components of the flexible queue application 130, interact with the flexible queue application 130, interact with any number (including zero) and/or types of other software applications, interact with the message database 150, interact with any number and/or types of other databases and/or memories, or any combination thereof.

In some embodiments, the background process 140 automatically updates the states of messages, modifies flexible priority queues, or any combination thereof based on any amount and/or types of criteria. For instance, in some embodiments, if a message is invisible for longer than the applicable invisibility duration, then the background process 140 automatically updates the state of the message to pending. In the same or other embodiments, if a message is running for longer than the applicable lease duration, then the background process 140 automatically updates the state of the message to invisible, pending, or error depending on the number of processing attempts, the associated maximum attempts, and/or any applicable invisibility duration. Exemplary state transitions associated with expired leases are described in greater detail below in conjunction with FIG. 4. In some embodiments, if a message is in a terminal state, then the background process 140 deletes the message from the flexible priority queue storing the message, performs zero or more other clean-up operations, and updates the state of the message to final.

The background process 140 can execute any number and/or types of operations on queues, messages, and/or states, execute any number and/or types algorithms based on queues, messages, and/or states, or any combination thereof.

In some embodiments, the background process 140 can interact with any of the flexible queue services and/or other components of the flexible queue application 130, interact with the flexible queue application 130, interact with any number and/or types of other software applications, interact with the message database 150, interact with any number and/or types of other databases and/or memories, or any combination thereof. In some embodiments, the flexible queue application 130 can include, without limitation, any number and/or types of other background processes in addition to the background process 140. In the same or other embodiments, the functionality described herein with respect to the background process 140 can be distributed across any number of background processes.

In some embodiments, the flexible queue application 130 (e.g., via the flexible queue services and the background process 140) stores, without limitation, the selective priority queue 160, zero or more other selective priority queues (indicated via ellipses), the exclusive priority queue 170, zero or more other exclusive priority queues (indicated via ellipses), and message states 180(1)-180(M), where M can be any positive integer, in the message database 150. In some embodiments, each message is stored in one of the flexible priority queues. In some other embodiments, each message can be stored in any technically feasible fashion and can be associated with one of the flexible priority queues in any technically feasible fashion.

In some embodiments, the message states 180(1)-180(M) specify states of the messages that are stored across the flexible priority queues, where M is the total number of messages stored across the flexible priority queues. For explanatory purposes, the message states 180(1)-180(M) are also referred to herein individually as "the message state 180" and collectively as "the message states 180." The message states 180 can be organized in any technically feasible fashion. For instance, in some embodiments, the message states 180 for the messages in each flexible priority queue are stored within the flexible priority queue. In some other embodiments, each message state 180 is stored inside the corresponding message. In some embodiments, non-terminal message states are maintained in the message database 150.

The message database 150 can be any type of database. For instance, in some embodiments, the message database 150 is an in-memory key-value data store. In the same or other embodiments, the message database 150 can include, without limitation, any amount and/or types of data structures and/or other functionality that facilitates efficient implementation of any number and/or types of queues. In some embodiments, the message database 150 can be replaced and/or supplemented with any number and/or types of other databases, memories, other storage, or any combination thereof.

Each flexible priority queue includes, without limitation, any amount and/or types of settings and any number of messages. The selective priority queue 160 and the exclusive priority queue 170 are described in more detail below in conjunction with FIGS. 2A and 2B, respectively. In some embodiments, each flexible priority queue is an abstract data structure that can be implemented via any number and/or types of non-abstract data structures in any technically feasible fashion. For instance, in some embodiments, each flexible priority queue is implemented as a sorted set that includes, without limitation, messages sorted by priority. In the same or other embodiments, each sorted set enables efficient access by message IDs included in the messages, priority order, priority, or any combination thereof.

In some embodiments, the flexible queue application 130, the message database 150, any number of non-abstract data structures, or any combination thereof facilitate accesses of messages stored in flexible priority queues based on any type of priority policy. For instance, in some embodiments, the priorities specified in the messages are deadlines and each of the flexible priority queues stores messages within a data structure that is optimized to access to messages in an earliest-deadline-first order. As described in greater detail below in conjunction with FIGS. 2A and 2B, in some embodiments, the message having the earliest deadline within each flexible priority queue is the head of the flexible priority queue, and the message having the latest deadline within the flexible priority queue is the tail of the flexible priority queue.

It will be appreciated that the system 100 shown herein is illustrative and that variations and modifications are possible. The connection topology, including the location and arrangement of the clients 120, the compute instance 110, and the message database 150 can be modified as desired. In some embodiments, one or more components shown in FIG. 1 may not be present. In the same or other embodiments, the functionality of the flexible queue application 130, the administrative service 132, the producer service 134, the consumer service 138, the background process 140, or any combination thereof can be distributed across any number of other software applications, software services, components, or any combination thereof that may or may not be included in the system 100.

Note that the techniques described herein are illustrative rather than restrictive, and can be altered without departing from the broader spirit and scope of the embodiments. Many modifications and variations will be apparent to those of ordinary skill in the art without departing from the scope and spirit of the described embodiments and techniques. Further, in some embodiments, any number of the techniques disclosed herein may be implemented while other techniques may be omitted in any technically feasible fashion. In the same or other embodiments, the system 100, the clients 120, the message database 150, the flexible queue application 130, the administrative service 132, the producer service 134, the consumer service 138, the background process 140, or any combination thereof may implement any number and/or types of additional functionality.

Figure 2A:
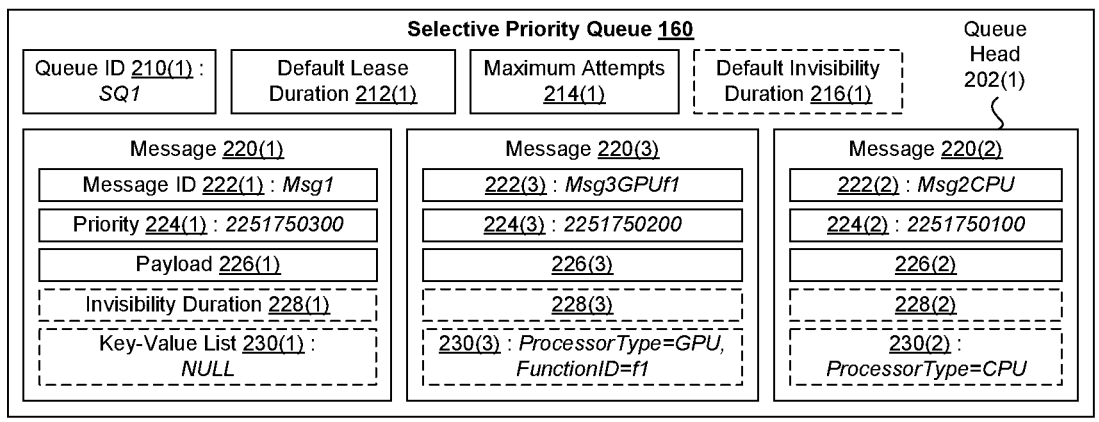
FIG. 2A is an example of the selective priority queue of FIG. 1, according to various embodiments.

FIG. 2A is an example of the selective priority queue 160 of FIG. 1, according to various embodiments. For explanatory purposes only, FIG. 2A depicts an example of the selective priority queue 160 at a point-in-time when clients 120 have sequentially added, a message 220(1), a message 220(2), and a message 220(3) to the selective priority queue 160. In some other embodiments and/or at other points-in-time, the selective priority queue 160 can store, without limitation any number of messages.

As shown, in the depicted embodiment at the depicted point-in-time, the selective priority queue 160 includes, without limitation, a queue ID 210(1), a default lease duration 212(1), a maximum attempts 214(1), a default invisibility duration 216(1), the message 220(2), the message 220(3), and the message 220(1). In some embodiments, the queue ID 210(1), the default lease duration 212(1), and the maximum attempts 214(1) are mandatory settings. In the same or other embodiments, the default invisibility duration 216(1) is an optional setting.

In some embodiments, the queue ID 210(1) specifies a UID for the selective priority queue 160. The default lease duration 212(1) specifies a default duration for each lease of each message stored the selective priority queue 160. The maximum attempts 214(1) specifies a maximum number of processing attempts for each message stored in the selective priority queue 160. In some embodiments, when the number of failed attempts to process a message included in the selective priority queue 160 is equal to the maximum attempts 214(1), then the consumer service 138 changes the state of the message to error. Subsequently, the background process 140 deletes the message from the selective priority queue 160.

In some embodiments, if the default invisibility duration 216(1) is non-zero, then the default invisibility duration 216(1) is a default duration of a state of invisible for each message stored in the selective priority queue 160 that the message is required to pass through before the state of the message can be updated to pending. In the same or other embodiments, if the default invisibility duration 216(1) is not specified, then the default invisibility duration 216(1) is zero.

As noted previously herein in conjunction with FIG. 1, the default invisibility duration 216(1) is not necessarily the applicable invisibility duration for a given message stored in the selective priority queue 160 at a given point-in-time. As described in greater detail below in conjunction with FIG. 4, in some embodiments, if the applicable invisibility duration associated with a message is zero, then the state of the message can be directly updated to pending without an intervening transition to invisible.

As shown, in some embodiments, the message 220(1) includes, without limitation, a message ID 222(1), a priority 224(1), a payload 226(1), an invisibility duration 228(1), and a key-value list 230(1). The message 220(2) includes, without limitation, a message ID 222(2), a priority 224(2), a payload 226(2), an invisibility duration 228(2), and a key-value list 230(2). The message 220(3) includes, without limitation, a message ID 222(3), a priority 224(3), a payload 226(3), an invisibility duration 228(3), and a key-value list 230(3). In some embodiments, the invisibility durations 228(1)-228(3) and the key-value lists 230(1)-230(3) are optional.

In some embodiments, the message IDs 222(1)-222(3) are UIDs, the priorities 224(1)-224(3) specify deadlines as points-in-time, and the payloads 226(1)-226(3) are blobs. In the same or other embodiments, any number of the payloads 226(1)-226(3) are blobs that specify tasks. In some embodiments, the invisibility durations 228(1)-228(3), if specified, override the default invisibility duration 216(1) for the messages 220(1)-220(3), respectively.

In some embodiments, each of the key-value lists 230(1)-230(3) includes, without limitation, zero or more key-value pairs. In the same or other embodiments, each of the key-value lists 230(1)-230(3) can include no more than a maximum number of key-value pairs (e.g., 4). As described previously herein in conjunction with FIG. 1, the key-value pairs in the key-value list 230(1)-230(3) are also referred to herein query metadata for the messages 220(1)-220(3), respectively.

For explanatory purposes, exemplary values for the queue ID 210(1), the message IDs 222(1)-222(3), the priorities 224(1)-224(3), and the key-value lists 230(1)-230(3) are depicted italics. As shown, in some embodiments, the queue ID 210(1) is "SQ1," and the message IDs 222(1)-222(3) are "Msg1," "Msg2CPU," and "Msg3GPUf1," respectively. The priorities 224(1)-224(3) are 2251750300, 2251750100, and 2251750200, respectively. The key-value list 230(1) is empty. The key-value list 230(2) includes, without limitation, the key-value pair of processor type and CPU denoted as "ProcessorType=CPU." The key-value list 230(3) includes, without limitation, the key-value pair of processor type and GPU and the key-value pair of function ID and f1. The key-value list 230(3) is denoted as "ProcessorType=GPU, FunctionID=f1."

As shown, in some embodiments the message 220(1), the message 220(2), and the message 220(3) are arranged within the selective priority queue 160 in an earliest-deadline-first order. More specifically, because the deadline specified via the priority 224(2) is earlier than both the deadline specified via the priority 224(1) and the deadline specified via the priority 224(3), the message 220(2) is a queue head 202(1) of the selective priority queue 160. And because the deadline specified via the priority 224(3) is earlier than the deadline specified via the priority 224(1), the message 220(1) is the tail of the selective priority queue 160, and the message 220(3) is between the messages 220(2) and 220(1) within the selective priority queue 160.

Figure 2B:
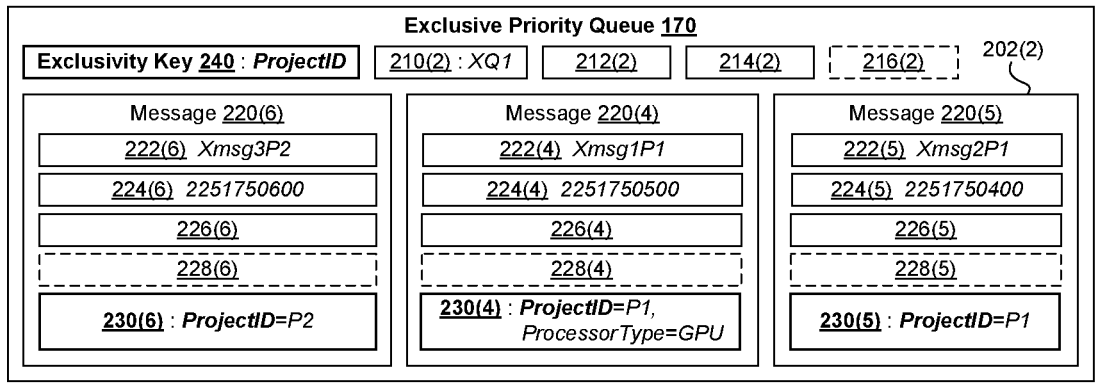
FIG. 2B is an example of the exclusive priority queue of FIG. 1, according to various embodiments.

FIG. 2B is an example of the exclusive priority queue 170 of FIG. 1, according to various embodiments. For explanatory purposes only, FIG. 2B depicts an example of the exclusive priority queue 170 at a point-in-time when clients 120 have sequentially added, a message 220(4), a message 220(5), and a message 220(6) to the exclusive priority queue 170. In some other embodiments and/or at other points-in-time, the exclusive priority queue 170 can store, without limitation any number of messages.

As shown, in the depicted embodiment at the depicted point-in-time, the exclusive priority queue 170 includes, without limitation, an exclusivity key 240, a queue ID 210(2), a default lease duration 212(2), a maximum attempts 214(2), a default invisibility duration 216(2), the message 220(5), the message 220(4), and the message 220(6). In some embodiments, the exclusivity key 240, the queue ID 210(2), the default lease duration 212(2), and the maximum attempts 214(2) are mandatory settings. In the same or other embodiments, the default invisibility duration 216(1) is an optional setting.

In some embodiments, the queue ID 210(2) specifies a UID for the exclusive priority queue 170. The default lease duration 212(2) specifies a default duration for each lease of each message stored the exclusive priority queue 170. The maximum attempts 214(2) specifies a maximum number of processing attempts for each message stored in the exclusive priority queue 170. In some embodiments, when the number of failed attempts to process a message in the exclusive priority queue 170 is equal to the maximum attempts 214(2), then the consumer service 138 changes the state of the message to error. Subsequently, the background process 140 deletes the message from the exclusive priority queue 170.

In some embodiments, if the default invisibility duration 216(2) is non-zero, then the default invisibility duration 216(2) is a default duration of a state of invisible for each message stored in the exclusive priority queue 170 that the message is required to pass through before the state of the message can be updated to pending. In the same or other embodiments, if the default invisibility duration 216(2) is not specified, then the default invisibility duration 216(2) is zero.

As noted previously herein in conjunction with FIG. 1, the default invisibility duration 216(2) is not necessarily the applicable invisibility duration for a given message stored in the exclusive priority queue 170 at a given point-in-time. As described in greater detail below in conjunction with FIG. 4, in some embodiments, if the applicable invisibility duration associated with a message is zero, then the state of the message can be directly updated to pending without an intervening transition to invisible.

As shown, in some embodiments, the message 220(4) includes, without limitation, a message ID 222(4), a priority 224(4), a payload 226(4), an invisibility duration 228(4), and a key-value list 230(4). The message 220(5) includes, without limitation, a message ID 222(5), a priority 224(5), a payload 226(5), an invisibility duration 228(5), and a key-value list 230(5). The message 220(6) includes, without limitation, a message ID 222(6), a priority 224(6), a payload 226(6), an invisibility duration 228(6), and a key-value list 230(6). In some embodiments, the invisibility durations 228(4)-228(6) are optional.

In some embodiments, the message IDs 222(4)-222(6) are UIDs, the priorities 224(4)-224(6) specify deadlines as points-in-time, and the payloads 226(4)-226(6) are blobs. In the same or other embodiments, any number of the payloads 226(4)-226(6) are blobs that specify tasks. In some embodiments, the invisibility durations 228(4)-228(6), if specified, override the default invisibility duration 216(1) for the messages 220(4)-220(6), respectively. In some embodiments, each of the key-value lists 230(4)-230(6) includes, without limitation, a key-value pair that specifies the exclusivity key 240 and a value for the exclusivity key 240 and zero or more other key-value pairs.

For explanatory purposes, exemplary values for the exclusivity key 240, the queue ID 210(2), the message IDs 222(4)-222(6), the priorities 224(4)-224(6), and the key-value lists 230(4)-230(6) are depicted italics. As shown, in some embodiments, the exclusivity key 240 is a project ID and is denoted as "ProjectID." In the same or other embodiments, the queue ID 210(2) is "XQ1," and the message IDs 222(4)-222(6) are "Xmsg1P1," "Xmsg2P1," and "Xmsg3P2," respectively. The priorities 224(4)-224(6) are 2251750500, 2251750400, and 2251750600, respectively. The key-value list 230(4) includes, without limitation the key-value pair of project ID and 1 and the key-value pair of processor type and GPU and is denoted as "ProjectID=P1, ProcessorType=GPU." The key-value list 230(5) includes, without limitation the key-value pair of project ID and 1 and is denoted as "ProjectID=P1." The key-value list 230(6) includes, without limitation the key-value pair of project ID and 1 and is denoted as "ProjectID=P2."

As shown, in some embodiments the message 220(4), the message 220(5), and the message 220(6) are arranged within the exclusive priority queue 170 in an earliest-deadline-first order. More specifically, because the deadline specified via the priority 224(5) is earlier than both the deadline specified via the priority 224(4) and the deadline specified via the priority 224(6), the message 220(5) is a queue head 202(2) of the exclusive priority queue 170. And because the deadline specified via the priority 224(4) is earlier than the deadline specified via the priority 224(6), the message 220(6) is the tail of the exclusive priority queue 170, and the message 220(4) is between the messages 220(5) and 220(6) within the exclusive priority queue 170.

Processing Requests to Allocate Messages from Flexible Priority Queues

Figure 3:
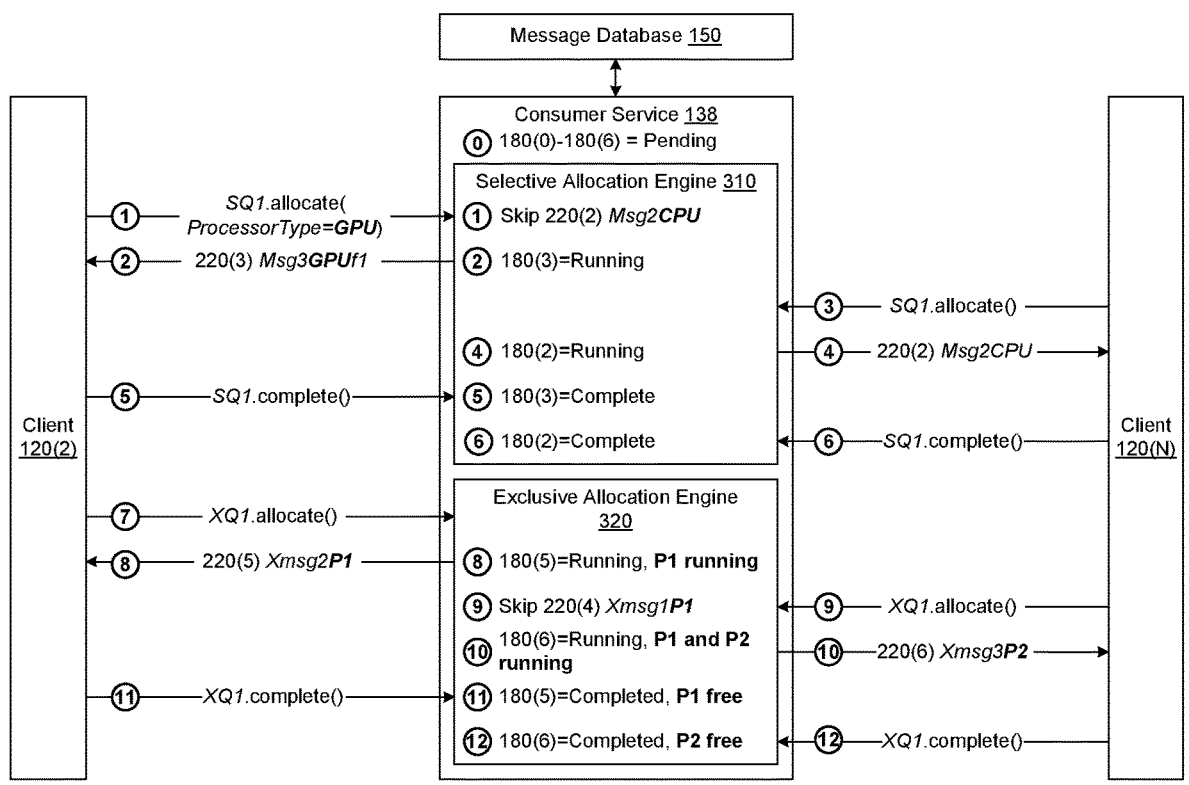
FIG. 3 is a more detailed illustration of the consumer service of FIG. 1, according to various embodiments.

FIG. 3 is a more detailed illustration of the consumer service 138 of FIG. 1, according to various embodiments. As described previously herein in conjunction with FIG. 1, in some embodiments, the consumer service 138 implements a consumer API (not shown), that enables clients 120 to lease messages from any number of selective priority queues (including the selective priority queue 160), lease messages from any number exclusive priority queues (including the exclusive priority queue 170), extend leases of running messages, indicate successful processing attempts for running messages, indicate failed processing attempts for running messages, postpone running messages, and cancel invisible, running, or pending messages. As shown, in some embodiments, the consumer service 138 includes, without limitation, a selective allocation engine 310 and an exclusive allocation engine 320.

In some embodiments, the selective allocation engine 310 responds to API calls from consumers of the selective priority queues (e.g., the selective priority queue 160) included in the message database 150. In the same or other embodiments, the exclusive allocation engine 320 responds to API calls from consumers of the exclusive priority queues (e.g., the exclusive priority queue 170) included in the message database 150.

For explanatory purposes, a sequence of numbered bubbles depicts exemplary operations associated with a exemplary sequence of consumer API calls that are issued by the clients 120(2) and 120(N) to process messages stored in the examples of the selective priority queue 160 and the exclusive priority queue 170 depicted in FIGS. 2A and 2B, respectively.

As depicted with the bubble numbered 0, the message states 180(1)-180(6) associated with the messages 220(1)-220(6), respectively, are pending and therefore the messages 220(1)-220(6) are pending messages. Although not shown, the client 120(2) is executing on a GPU. As depicted with the bubble numbered 1, the client 120(2) issues a consumer API call that requests a message from the selective priority queue 160 based on a filter that includes, without limitation, the key-value pair of processor type and GPU. As shown in italics, in some embodiments, the consumer API call is "SQ1.allocate(ProcessorType=GPU)." Referring back to FIG. 2A, "SQ1" is the queue ID 210(1) included in the selective priority queue 160.

Advantageously, specifying the key-value pair of processor type and GPU substantially increases the likelihood that any message that is leased to the client 120(2) in response to the consumer API call specifies a task that can benefit from the parallel processing capabilities of the GPU. Accordingly, resource utilization can be improved.

In response to the API call from the client 120(2), the selective allocation engine 310 determines that the highest priority pending message in the selective priority queue 160 is the message 220(2) that includes the message ID 222(2) of "Msg2CPU." However, because the key-value list 230(2) does not include the key-value pair of processor type and GPU, the selective allocation engine 310 skips the message 220(2), as also depicted with the bubble numbered 1.

The selective allocation engine 310 then determines that the next highest priority pending message included in the selective priority queue 160 is the message 220(3) that includes the message ID 222(3) of "Msg3GPUf1." Referring back now to FIG. 2A, the key-value list 230(3) includes, without limitation the key-value pair of processor type and GPU and the key-value pair of function ID and "f1" Since the key-value list 230(3) includes the key-value pair of processor type and GPU, the selective allocation engine 310 determines that the message 220(3) is the highest priority pending message included in the selective priority queue 160 that satisfies the specified allocation constraint. Accordingly, as depicted with the bubble numbered 2, the selective allocation engine 310 updates the message state 180(3) to running and leases the message 220(3) to the client 120(2) for the default lease duration 212(1).

As depicted with the bubble numbered 3, while the client 120(2) is processing the message 220(3), the client 120(N)

issues a consumer API call that requests a message from the selective priority queue 160 and does not specify a filter. As shown, in some embodiments, the consumer API call is "SQ1.allocate( )" In response, the selective allocation engine 310 leases the highest priority pending message included in the selective priority queue 160 to the client 120(N). More precisely, and as depicted with the bubble numbered 4, the selective allocation engine 310 updates the message state 180(2) to running and leases the message 220(2) that is the queue head 202(1) of the selective priority queue 160 to the client 120(N) for the default lease duration 212(1).

As depicted with the bubbles numbered 5 and 6, the clients 120(2) and 120(N) successfully process the messages 220(3) and 220(2), respectively and issue consumer API calls of "SQ1.complete( )" before the associated leases expire. In response, and as also depicted with the bubbles numbered 5 and 6, the selective allocation engine 310 updates the message states 180(3) and 180(2) to complete. Although not shown, the background process 140 automatically deletes the messages 220(3) and 220(2) from the selective priority queue 160.

As depicted with the bubble numbered 7, the client 120(2) issues a consumer API call that requests a message from the exclusive priority queue 170 and does not specify a filter. Referring back to FIG. 2B, the queue ID 210(2) included in the exclusive priority queue 170 is "XQ1." Accordingly in some embodiments, the consumer API call is "XQ1.allocate( )" Because none of the messages 220(4)-220(6) included in the exclusive priority queue 170 are running, the exclusive allocation engine 320 leases the highest priority pending message included in the exclusive priority queue 170 to the client 120(2). More precisely, and as depicted with the bubble numbered 8, the exclusive allocation engine 320 updates the message state 180(5) to running and leases the message 220(5) that is the queue head 202(2) of the exclusive priority queue 170 to the client 120(2) for the default lease duration 212(2).

Referring back to FIG. 2B, the exclusivity key 240 included in the exclusive priority queue 170 is the project ID or "projectID," and the message 220(5) specifies a value of P1 for the project ID. Accordingly, as depicted via the bubble numbered 8, the value of P1 for the exclusivity key 240 is associated with a running message that is included in the exclusive priority queue 170. As depicted with the bubble numbered 9, while the client 120(2) is processing the message 220(5), the client 120(N) issues a consumer API call that requests a message from the exclusive priority queue 170 and does not specify a filter.

Referring back to FIG. 2B, the highest priority pending message included in the exclusive priority queue 170 is the message 220(4) that specifies a value of P1 for the exclusivity key 240. Because the value of P1 for the exclusivity key 240 is already associated with a running message that is included in the exclusive priority queue 170, the exclusive allocation engine 320 skips the message 220(4), as depicted with the bubble numbered 9.

Subsequently, the exclusive allocation engine 320 determines that the message 220(6) is the highest priority pending message included in the exclusive priority queue 170 that does not specify a value of P1 for the exclusivity key 240 and therefore satisfies the exclusivity allocation constraint. Accordingly, as depicted with the bubble numbered 10, the exclusive allocation engine 320 updates the message state 180(6) to running and leases the message 220(6) to the client 120(N) for the default lease duration 212(2). As shown, the values of P1 and P2 for the exclusivity key 240 are associated with running messages that are included in the exclusive priority queue 170.

As depicted with the bubbles numbered 11 and 12, the clients 120(2) and 120(N) successfully process the messages 220(5) and 220(6), respectively, and issue consumer API calls of "XQ1.complete( )" before the associated leases expire. In response, and as also depicted with the bubbles numbered 11 and 12, the exclusive allocation engine 320 updates the message states 180(5) and 180(6) to complete. Although not shown, the background process 140 automatically deletes the messages 220(5) and 220(6) from the exclusive priority queue 170.

Figure 4:
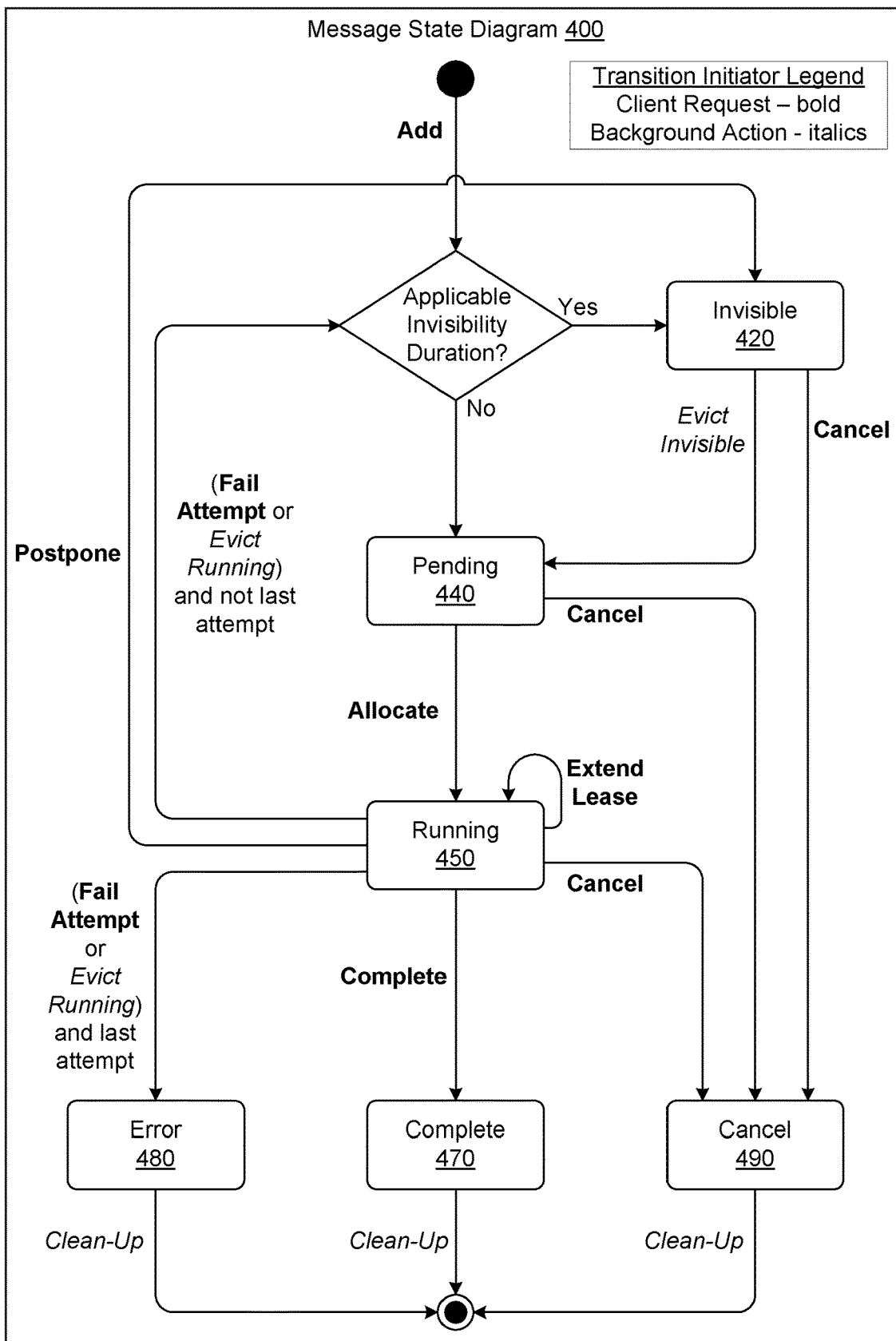
FIG. 4 is a message state diagram associated with the message states of FIG. 1, according to various embodiments.

FIG. 4 is a message state diagram 400 associated with the message states 180(1)-180(M) of FIG. 1, according to various embodiments. As described previously herein in conjunction with FIG. 1, in some embodiments, the flexible queue application 130 establishes a message lifecycle for the messages stored in flexible priority queues via a set of states and associated state transformations. In the same or other embodiments the states of the messages are specified via the messages states 180(1)-180(M). The message state diagram 400 is a state diagram that indicates how the flexible queue application 130 updates the state of a message based on triggering events. For explanatory purposes, the message state diagram 400 is described herein in the context of a message that is associated with the message state 180 and is added to a flexible priority queue (e.g., the selective priority queue 160, the exclusive priority queue 170, etc).

Before the flexible queue application 130 adds the message to the flexible priority queue, the message in an initial state that is represented in the message state diagram by a filled circle followed by an arrow. In the same or other embodiments, at any point-in-time while the message is stored in the flexible priority queue, the message state 180 can be invisible 420, pending 440, running 450, complete 470, error 480, or cancel 490. In some embodiments, after the flexible queue application 130 deletes the message from the flexible priority queue, the message is a final state that is represented by an arrow pointing to an unfilled circle encompassing a filled circle.

When the message state 180 is invisible 420, the message is invisible and temporarily unavailable for leasing. When the message state 180 is pending 440, the message is pending and is available for leasing. When the message state 180 is running 450, the message is leased to a consumer that is processing the message. When the message state 180 is complete 470, the message has been successfully processed by a consumer before the applicable lease expired. When the message state 180 is error 480, the message has not been successfully processed by a consumer before the associated lease expired during a last attempt to process the message as per the maximum attempts specified in the priority queue. When the message state 180 is cancel 490, one of the clients 120(1)-120(N) canceled the processing of the message.

Solid arrows between states indicate state transitions and are labeled with "triggering" events that can trigger the flexible queue application 130 to execute the state transition. In some embodiments, each triggering event is associated with a client request or a background action. In some embodiments, each client request is an API call received from one of the clients 120(1)-120(N). In the same or other embodiments, each background action is an action performed by the background process 140. For explanatory purposes, in the context of the message state diagram 400, client requests are depicted in bold and background actions are depicted in italics.

In some embodiments, if the producer service 134 adds a message that is in the initial state to a flexible priority queue in response to an "add" client request, then the producer service 134 determines an applicable invisibility duration for the message. As shown, if the applicable invisibility duration is greater than zero, then the producer service 134 updates the message state 180 to invisible 420. Otherwise, the producer service 134 updates the message state 180 to pending 440.

The producer service 134 can determine the applicable invisibility duration in any technically feasible fashion. In some embodiments, if an invisibility duration is specified in the triggering client request, then the producer service 134 sets the applicable invisibility duration equal to the specified invisibility duration. Otherwise, if the message specifies an invisibility duration, then the producer service 134 sets the applicable invisibility duration equal to the invisibility duration specified in the message. Otherwise, if the flexible priority queue specifies a default invisibility duration, then the producer service 134 sets the applicable invisibility duration equal to the default invisibility duration. Otherwise, the flexible priority queue sets the applicable invisibility duration equal to zero.

While the message state 180 is invisible 420, pending 440, or running 450, if the consumer service 138 receives a "cancel" client request for the message, then the consumer service 138 updates the message state 180 to cancel 490.

While the message state 180 is pending 440, if the consumer service 138 leases the message to a consumer for an applicable lease duration in response to an "allocate" client request, then the consumer service 138 updates the message state 180 to running 450. The consumer service 138 can determine the applicable lease duration in any technically feasible fashion. In some embodiments, if a lease duration is specified in the triggering allocate client request, then the consumer service 138 sets the applicable invisibility duration equal to the specified lease duration. Otherwise, the consumer service 138 sets the applicable invisibility duration equal to the default lease duration specified in the flexible priority queue.

When the message state 180 is running 450, if the consumer service 138 receives a "complete" client request for the message, then the consumer service 138 updates the message state 180 to complete 470.

While the message state 180 is running 450, if the consumer service 138 receives an "extend lease" client request, then the consumer service 138 extends the applicable lease duration but does not change the message state 180.

While the message state 180 is running 450, if the consumer service 138 receives a "postpone" client request, then the consumer service 138 determines the applicable invisibility duration and updates the message state 180 to invisible 420. In some embodiments, the "postpone" client request reverses an attempt counter increment that occurred when the message state 180 transitioned to running 450. For instance, in some embodiments, the consumer service 138 increments an attempt counter associated with the message from x to (x+1) when updating the message state 180 to running 450 and decrements the attempt counter from (x+1) to x when updating the message state 180 to invisible 420 in response to a "postpone" client request.

While the message state 180 is running 450, if the consumer service 138 receives a "fail attempt" client request and the number of attempts to process the message is less than the maximum attempts specified in the flexible priority queue, then the consumer service 138 determines the applicable invisibility duration for the message. As shown, if the applicable invisibility duration is greater than zero, then the consumer service 138 updates the message state 180 to invisible 420. Otherwise, the consumer service 138 updates the message state 180 to pending 440.

While the message state 180 is running 450, if the consumer service 138 receives a "fail attempt" client request and the number of attempts to process the message is equal to the maximum attempts specified in the flexible priority queue, then the consumer service 138 updates the message state 180 to error 480.

While the message state 180 is invisible 420, if the background process 140 determines that the message has been invisible for longer than the applicable invisibility duration, then the background process 140 executes an evict invisible action on the message. As part of or in response to the evict invisible action, the background process 140 or the flexible queue application 130 updates the message state 180 to pending 440.

While the message state 180 is running 450, if the background process 140 determines that the message has been running for longer than the applicable lease duration, then the background process 140 executes an evict running action on the message. As part of or in response to the evict running action, the background process 140 or the flexible queue application 130 updates the message state 180 to error 480, invisible 420, or pending 440. More precisely, if the number of attempts to process the message is equal to the maximum attempts specified in the flexible priority queue, then the background process 140 or the flexible queue application 130 updates the message state 180 to error 480. Otherwise, if the applicable invisibility duration is greater than zero, then the background process 140 or the flexible queue application 130 updates the message state 180 to invisible 420. Otherwise, the background process 140 or the flexible queue application 130 updates the message state 180 to pending 440.

When the message state 180 is complete 470, error 480, or cancel 490, the background process 140 executes a clean-up action that deletes the message from the flexible priority queue. The message is then in the final state.

Figure 5:
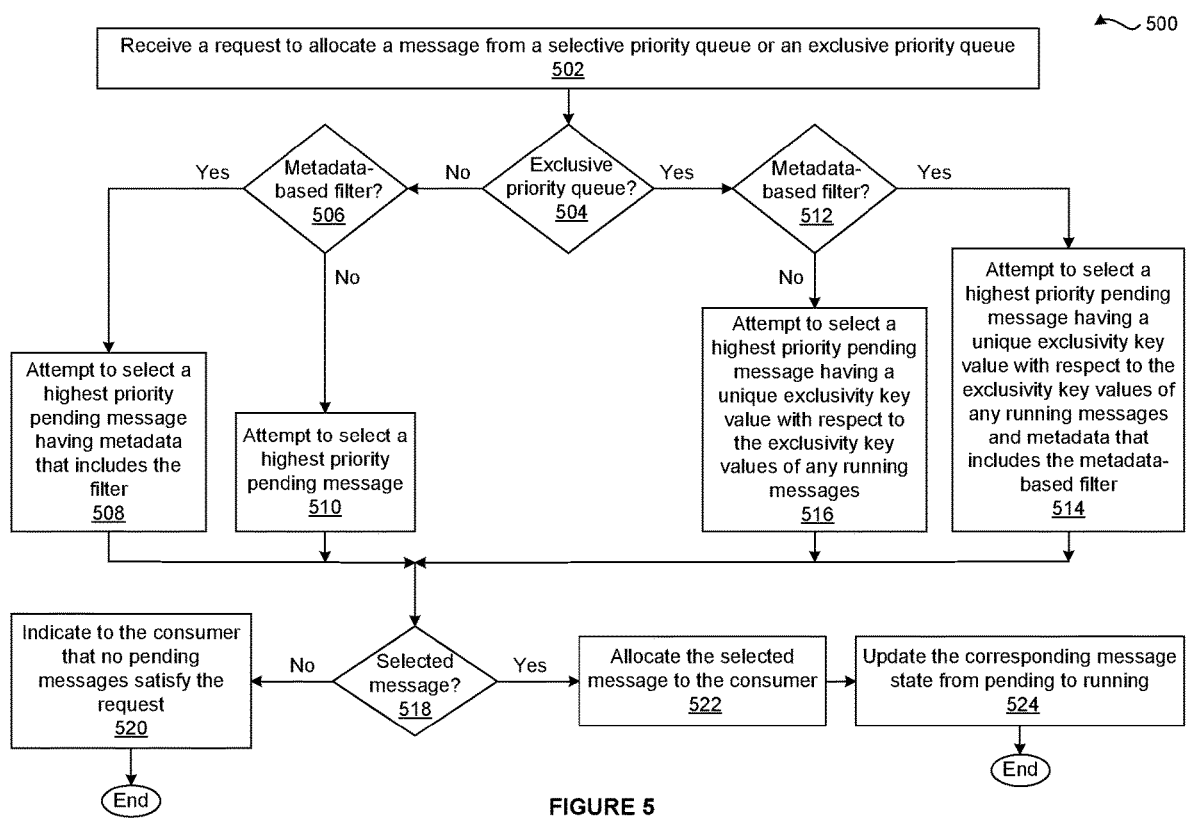
FIG. 5 is a flow diagram of method steps for processing a request to allocate a message from a priority queue, according to various embodiments.

FIG. 5 is a flow diagram of method steps for processing a request to allocate a message from a priority queue, according to various embodiments. Although the method steps are described with reference to the systems of FIGS. 1-4, persons skilled in the art will understand that any system configured to implement the method steps, in any order, falls within the scope of the various embodiments.

As shown, a method 500 begins at step 502, where the flexible queue application 130 receives a request from a consumer to allocate a message from a selective priority queue or an exclusive priority queue. At step 504, the flexible queue application 130 determines whether the request is for an exclusive priority queue. If, at step 504, the flexible queue application 130 determines that the request is not for an exclusive priority queue, then the method 500 proceeds to step 506.

At step 506, the flexible queue application 130 determines whether the request specifies a metadata-based filter (e.g., one or more key-value pairs). If, at step 506, the flexible queue application 130 determines that the request specifies a metadata-based filter, then the method 500 proceeds to step 508. At step 508, the flexible queue application 130 attempts to select, from the selective priority queue, the highest priority pending message having metadata that includes the filter. The method 500 then proceeds directly to step 518.

If, however, at step 506, the flexible queue application 130 determines that the request does not specify a metadata-based filter, then the method 500 proceeds directly to step 510. At step 510, the flexible queue application 130 attempts to select the highest priority pending message from the selective priority queue. The method 500 then proceeds directly to step 518.

Referring back to step 504, if the flexible queue application 130 determines that the request is for an exclusive priority queue, then the method 500 proceeds directly to step 512. At step 512, the flexible queue application 130 determines whether the request specifies a metadata-based filter (e.g., one or more key-value pairs). If, at step 512, the flexible queue application 130 determines that the request specifies a metadata-based filter, then the method 500 proceeds to step 514. At step 514, the flexible queue application 130 attempts to select, from the exclusive priority queue, a highest priority pending message having a unique exclusivity key value with respect to the exclusivity key values of any running messages and metadata that includes the filter. The method 500 then proceeds directly to step 518.

If, however, at step 512, the flexible queue application 130 determines that the request does not specify a metadata-based filter, then the method 500 proceeds directly to step 516. At step 516, the flexible queue application 130 attempts to select, from the exclusive priority queue, a highest priority pending message having a unique exclusivity key value with respect to the exclusivity key values of any running messages. The method 500 then proceeds to step 518.

At step 518, the flexible queue application 130 determines whether the flexible queue application 130 has selected a message. If, at step 518, the flexible queue application 130 determines that the flexible queue application 130 has not selected a message, then the method 500 proceeds to step 520. At step 520, the flexible queue application 130 indicates, to the consumer, that no pending messages satisfy the request. The method 500 then terminates.

If, however, at step 518, the flexible queue application 130 determines that the flexible queue application 130 has selected a message, then the method 500 proceeds directly to step 522. At step 522, the flexible queue application 130 allocates (e.g., leases) the selected message to the consumer. At step 524, the flexible queue application 130 updates the message state 180 corresponding to the message from pending 440 to running 450. The method 500 then terminates.

In sum, the disclosed techniques can be used to take into account task-specific resource considerations when allocating tasks to consumers via priority queues. In some embodiments, a flexible queue application enables clients to create, add messages to, and lease messages from selective priority queues and exclusive priority queues. Each message stored in a selective priority queue includes, without limitation, a payload (e.g., a task), a priority, and zero or more key-value pairs. Some examples of keys include, without limitation, a project ID, a function ID, and a processor type. All messages stored in a selective priority queue can be leased concurrently. In response to a request to allocate a message from a selective priority queue, the flexible queue application identifies the highest priority of any pending messages stored in the selective priority queue having at least each of zero or more key-value pairs specified via the allocation request. If the flexible queue application successfully identifies a pending message, then the flexible queue application leases the pending message to the client that issued the allocation request.

In the same or other embodiments, in response to a request to create an exclusive priority queue, the flexible queue application creates a new exclusive priority queue having an exclusivity key that is specified via the request. Each message stored in the exclusive priority queue includes, without limitation, a payload, a priority, a value for the exclusivity key (e.g., an exclusivity key-value pair), and zero or more other key-value pairs. For each exclusive priority queue, the flexible queue application prohibits concurrent execution of messages having the same value for the associated exclusivity key.

In response to a request to allocate a message from an exclusive priority queue, the flexible queue application identifies the highest priority pending messages stored in the exclusive priority queue having a unique exclusivity key value relative to the exclusivity key values of the running messages that are in the exclusive priority queue and having at least each of zero or more key-value pairs specified via the allocation request. If the flexible queue application successfully identifies a pending message, then the flexible queue application leases the pending message to the client that issued the allocation request.

At least one technical advantage of the disclosed techniques relative to the prior art is that, with the disclosed techniques, tasks stored in exclusive priority queues can be automatically serialized without reducing the throughput of the consumers of the exclusive priority queues. In that regard, because concurrency constraints are enforced as messages stored in exclusive priority queues are allocated to consumers, the consumers can drain messages from priority queues without reservation. Furthermore, with the disclosed techniques, because lower-priority messages can be distributed to consumers while the distribution of higher-priority messages is deferred as per values for exclusivity keys, concurrency is not unnecessarily curtailed. These technical advantages represent one or more technological advancements over prior art approaches.

1. In some embodiments, a computer-implemented method comprises receiving, from a first client, a first request to allocate a message from a priority queue; determining that a first message that is stored in the priority queue and is pending does not satisfy a first allocation constraint, wherein a first priority is associated with the first message; determining that a second message that is stored in the priority queue and is pending satisfies the first allocation constraint, wherein the first priority associated with the first message is higher than a second priority associated with the second message; and allocating the second message to the first client.

2. The computer-implemented method of clause 1, wherein determining that the first message does not satisfy the first allocation constraint comprises comparing a first exclusivity key value associated with the first message to a second exclusivity key value associated with a third message that is stored in the priority queue and is running.

3. The computer-implemented method of clauses 1 or 2, further comprising deleting the third message from the priority queue; receiving, from the first client, a second request to allocate a message from the priority queue; and allocating the first message to the first client.

4. The computer-implemented method of any of clauses 1-3, wherein determining that the first message does not satisfy the first allocation constraint comprises comparing at least one key-value pair specified via the first request to zero or more key-value pairs associated with the first message.

5. The computer-implemented method of any of clauses 1-4, wherein the first message is associated with a first exclusivity key value, and wherein determining that the first message does not satisfy the first allocation constraint comprises determining that a third message that is stored in the priority queue and is running is associated with the first exclusivity key value or determining that the first message is not associated with a first key-value pair specified via the first request.

6. The computer-implemented method of any of clauses 1-5, wherein the first allocation constraint is associated with a processor type, a function identifier, or a project identifier.

7. The computer-implemented method of any of clauses 1-6, further comprising receiving, from a second client, a second request to allocate a message from the priority queue; determining that the first message is pending and satisfies a second allocation constraint; and allocating the first message to the second client.

8. The computer-implemented method of any of clauses 1-7, further comprising receiving, from the first client, a second request to postpone the second message for a first duration of time; updating a state associated with the second message to indicate that the second message is invisible; and after determining that the first duration of time has elapsed, updating the state associated with the second message to indicate that the second message is pending.

9. The computer-implemented method of any of clauses 1-8, wherein the second message specifies a task and allocating the second message to the first client causes the first client to execute the task.

10. The computer-implemented method of any of clauses 1-9, wherein the first client comprises a microservice, a software application, or a function.

11. In some embodiments, one or more non-transitory computer readable media include instructions that, when executed by one or more processors, cause the one or more processors to perform the steps of receiving, from a first client, a first request to allocate a message from a priority queue; determining that a first message that is stored in the priority queue and is pending does not satisfy a first allocation constraint, wherein a first priority is associated with the first message; determining that a second message that is stored in the priority queue and is pending satisfies the first allocation constraint, wherein the first priority associated with the first message is higher than a second priority associated with the second message; and allocating the second message to the first client.

12. The one or more non-transitory computer readable media of clause 11, wherein determining that the first message does not satisfy the first allocation constraint comprises comparing a first exclusivity key value associated with the first message to a second exclusivity key value associated with a third message that is stored in the priority queue and is running.

13. The one or more non-transitory computer readable media of clauses 11 or 12, further comprising deleting the third message from the priority queue; receiving, from the first client, a second request to allocate a message from the priority queue; and allocating the first message to the first client.

14. The one or more non-transitory computer readable media of any of clauses 11-13, wherein determining that the first message does not satisfy the first allocation constraint comprises comparing at least one key-value pair specified via the first request to zero or more key-value pairs associated with the first message.

15. The one or more non-transitory computer readable media of any of clauses 11-14, wherein the at least one key-value pair specifies at least one of a processor type, a function identifier, or a project identifier.

16. The one or more non-transitory computer readable media of any of clauses 11-15, wherein the first message is associated with a first exclusivity key value, and wherein determining that the first message does not satisfy the first allocation constraint comprises determining that a third message that is stored in the priority queue and is running is associated with the first exclusivity key value or determining that the first message is not associated with a first key-value pair specified via the first request.

17. The one or more non-transitory computer readable media of any of clauses 11-16, further comprising receiving, from a second client, a second request to allocate a message from the priority queue; determining that the first message is pending and satisfies a second allocation constraint; and allocating the first message to the second client.

18. The one or more non-transitory computer readable media of any of clauses 11-17, further comprising determining that the first client has not successfully processed the second message within a lease duration of time; updating a state associated with the second message to indicate that the second message is invisible; and after an invisibility duration of time, updating the state associated with the second message to indicate that the second message is pending.

19. The one or more non-transitory computer readable media of any of clauses 11-18, wherein the second message specifies a task and allocating the second message to the first client causes the first client to execute the task.

20. In some embodiments, a system comprises one or more memories storing instructions and one or more processors coupled to the one or more memories that, when executing the instructions, perform the steps of receiving, from a first client, a first request to allocate a message from a priority queue; determining that a first message that is stored in the priority queue and is pending does not satisfy a first allocation constraint, wherein a first priority is associated with the first message; determining that a second message that is stored in the priority queue and is pending satisfies the first allocation constraint, wherein the first priority associated with the first message is higher than a second priority associated with the second message; and allocating the second message to the first client.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving, from a first client, a first request to allocate a message from a priority queue;
determining that a first message that is stored in the priority queue and is pending does not satisfy a first allocation constraint, wherein a first priority is associated with the first message;
determining that a second message that is stored in the priority queue and is pending satisfies the first allocation constraint, wherein the first priority associated with the first message is higher than a second priority associated with the second message; and
based on the second message satisfying the first allocation constraint, overriding the first priority associated with the first message, and allocating the second message to the first client.

2. The computer-implemented method of claim 1, wherein determining that the first message does not satisfy the first allocation constraint comprises comparing a first exclusivity key value associated with the first message to a second exclusivity key value associated with a third message that is stored in the priority queue and is running.

3. The computer-implemented method of claim 2, further comprising:
deleting the third message from the priority queue;
receiving, from the first client, a second request to allocate a message from the priority queue; and
allocating the first message to the first client.

4. The computer-implemented method of claim 1, wherein determining that the first message does not satisfy the first allocation constraint comprises comparing at least one key-value pair specified via the first request to zero or more key-value pairs associated with the first message.

5. The computer-implemented method of claim 1, wherein the first message is associated with a first exclusivity key value, and wherein determining that the first message does not satisfy the first allocation constraint comprises determining that a third message that is stored in the priority queue and is running is associated with the first exclusivity key value or determining that the first message is not associated with a first key-value pair specified via the first request.

6. The computer-implemented method of claim 1, wherein the first allocation constraint is associated with a processor type, a function identifier, or a project identifier.

7. The computer-implemented method of claim 1, further comprising:
receiving, from a second client, a second request to allocate a message from the priority queue;
determining that the first message is pending and satisfies a second allocation constraint; and
allocating the first message to the second client.

8. The computer-implemented method of claim 1, further comprising:
receiving, from the first client, a second request to postpone the second message for a first duration of time;
updating a state associated with the second message to indicate that the second message is invisible; and
after determining that the first duration of time has elapsed, updating the state associated with the second message to indicate that the second message is pending.

9. The computer-implemented method of claim 1, wherein the second message specifies a task and allocating the second message to the first client causes the first client to execute the task.

10. The computer-implemented method of claim 1, wherein the first client comprises a microservice, a software application, or a function.

11. One or more non-transitory computer readable media including instructions that, when executed by one or more processors, cause the one or more processors to perform the steps of:
receiving, from a first client, a first request to allocate a message from a priority queue;
determining that a first message that is stored in the priority queue and is pending does not satisfy a first allocation constraint, wherein a first priority is associated with the first message;
determining that a second message that is stored in the priority queue and is pending satisfies the first allocation constraint, wherein the first priority associated with the first message is higher than a second priority associated with the second message; and
based on the second message satisfying the first allocation constraint, overriding the first priority associated with the first message, and allocating the second message to the first client.

12. The one or more non-transitory computer readable media of claim 11, wherein determining that the first message does not satisfy the first allocation constraint comprises comparing a first exclusivity key value associated with the first message to a second exclusivity key value associated with a third message that is stored in the priority queue and is running.

13. The one or more non-transitory computer readable media of claim 12, further comprising:
deleting the third message from the priority queue;
receiving, from the first client, a second request to allocate a message from the priority queue; and
allocating the first message to the first client.

14. The one or more non-transitory computer readable media of claim 11, wherein determining that the first message does not satisfy the first allocation constraint comprises comparing at least one key-value pair specified via the first request to zero or more key-value pairs associated with the first message.

15. The one or more non-transitory computer readable media of claim 14, wherein the at least one key-value pair specifies at least one of a processor type, a function identifier, or a project identifier.

16. The one or more non-transitory computer readable media of claim 11, wherein the first message is associated with a first exclusivity key value, and wherein determining that the first message does not satisfy the first allocation constraint comprises determining that a third message that is stored in the priority queue and is running is associated with the first exclusivity key value or determining that the first message is not associated with a first key-value pair specified via the first request.

17. The one or more non-transitory computer readable media of claim 11, further comprising:
receiving, from a second client, a second request to allocate a message from the priority queue;
determining that the first message is pending and satisfies a second allocation constraint; and
allocating the first message to the second client.

18. The one or more non-transitory computer readable media of claim 11, further comprising:
determining that the first client has not successfully processed the second message within a lease duration of time;
updating a state associated with the second message to indicate that the second message is invisible; and
after an invisibility duration of time, updating the state associated with the second message to indicate that the second message is pending.

19. The one or more non-transitory computer readable media of claim 11, wherein the second message specifies a task and allocating the second message to the first client causes the first client to execute the task.

20. A system, comprising:
one or more memories storing instructions; and
one or more processors coupled to the one or more memories that, when executing the instructions, perform the steps of:
receiving, from a first client, a first request to allocate a message from a priority queue;
determining that a first message that is stored in the priority queue and is pending does not satisfy a first allocation constraint, wherein a first priority is associated with the first message;
determining that a second message that is stored in the priority queue and is pending satisfies the first allocation constraint, wherein the first priority associated with the first message is higher than a second priority associated with the second message; and
based on the second message satisfying the first allocation constraint, overriding the first priority associated with the first message, and allocating the second message to the first client.

\* \* \* \* \*